United States Patent
Filipovic et al.

(10) Patent No.: US 8,254,855 B2
(45) Date of Patent: Aug. 28, 2012

(54) FREQUENCY SPUR DETECTION AND SUPPRESSION

(75) Inventors: Daniel Fred Filipovic, Solana Beach, CA (US); Helena Deirdre O'Shea, San Diego, CA (US); Christos Komninakis, La Jolla, CA (US); Jifeng Geng, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1002 days.

(21) Appl. No.: 12/116,539

(22) Filed: May 7, 2008

(65) Prior Publication Data

US 2009/0279591 A1 Nov. 12, 2009

(51) Int. Cl.
*H04B 1/04* (2006.01)
*H04B 1/10* (2006.01)

(52) U.S. Cl. ............... 455/114.2; 455/305; 375/296; 375/346

(58) Field of Classification Search .......... 455/296, 455/303, 305, 306, 311, 312, 114.2; 375/346, 375/349, 350
See application file for complete search history.

(56) References Cited

U.S. PATENT DOCUMENTS

| | | | |
|---|---|---|---|
| 4,453,137 A | 6/1984 | Rittenbach | |
| 5,410,750 A | 4/1995 | Cantwell et al. | |
| 6,718,166 B2 | 4/2004 | Cordone et al. | |
| 6,807,222 B1 | 10/2004 | Widdowson | |
| 7,194,050 B2 | 3/2007 | Nicholls et al. | |
| 2001/0040932 A1* | 11/2001 | Lindquist et al. | ............. 375/346 |
| 2004/0057503 A1 | 3/2004 | Kelley | |
| 2005/0059366 A1* | 3/2005 | Choi et al. | ............. 455/130 |
| 2007/0153878 A1 | 7/2007 | Filipovic | |

FOREIGN PATENT DOCUMENTS

| | | |
|---|---|---|
| DE | 4220228 A1 | 4/1994 |
| WO | WO0046929 A1 | 8/2000 |

OTHER PUBLICATIONS

International Search Report and Written Opinion—PCT/US2009/043037, International Search Authority—European Patent Office—Nov. 3, 2009.

\* cited by examiner

*Primary Examiner* — Nguyen Vo
(74) *Attorney, Agent, or Firm* — Larry J. Moskowitz; William M. Hooks

(57) ABSTRACT

Techniques for identifying and suppressing frequency spurs in a signal are disclosed. In an embodiment, an incoming signal is rotated by a frequency related to a spur frequency, and an estimate of the content of the rotated signal is derived. The estimate may be subtracted from the rotated incoming signal, and the result de-rotated by the spur frequency. In an embodiment, the incoming signal may be rotated such that the spur is centered at DC. In an alternative embodiment, the estimate may be de-rotated before being subtracted from the original incoming signal. Techniques for addressing multiple spurs using serial and parallel architectures are disclosed. Further disclosed are techniques for searching for the presence of spurs in an incoming signal, and tracking spur frequencies over time.

28 Claims, 10 Drawing Sheets

FREQUENCY SPUR DETECTION AND SUPPRESSION

TECHNICAL FIELD

The disclosure relates to signal processing techniques, and more particularly, to techniques for detecting and suppressing frequency spurs in a signal.

BACKGROUND

A spur is a narrowband interference signal characterized by high spectral content at a single frequency known as a spur frequency. Spurs may originate locally at a device, e.g., harmonics of a reference oscillator for a transmitter or receiver, harmonics of clocks used for digital circuits in the device, mixing products of RF components, etc. Spurs may also originate from sources external to the device itself. Unmitigated, spurs may lead to unwanted effects such as stray signal emissions by a transmitter, as well as corruption of signals received by a receiver.

Techniques for suppressing spurs include passing a signal containing both the desired signal and the spurs through one or more notch filters designed to suppress spectral content at predetermined spur frequencies. Such techniques are described in, e.g., U.S. patent application Ser. No. 11/324,858, "Spur suppression for a receiver in a wireless communication system," filed Jan. 4, 2006, assigned to the assignee of the present application, the contents of which are hereby incorporated herein.

It would be desirable to provide further techniques for suppressing spurs, as well as for identifying spur frequencies and tracking them over time.

SUMMARY

An aspect of the present disclosure provides a method for suppressing at least one frequency spur from an input signal, the method comprising rotating the input signal by a first frequency to generate a first rotated signal; estimating a component of the first rotated signal corresponding to a first intermediate frequency; de-rotating the estimated component by the first frequency to generate a first de-rotated spur estimate; subtracting the first de-rotated spur estimate from a signal derived from the input signal.

Another aspect of the present disclosure provides a method for suppressing at least one frequency spur from an input signal, the method comprising: rotating the input signal by a first frequency to generate a first rotated signal; estimating a component of the first rotated signal corresponding to a first intermediate frequency to generate a first estimate; subtracting the first estimate from a signal derived from the first rotated signal to generate a first corrected signal; and de-rotating the first corrected signal by the first frequency to generate a first de-rotated corrected signal.

Yet another aspect of the present disclosure provides a method for identifying the presence of spur frequencies in an input signal, the method comprising: providing a first search frequency; computing a metric associated with the strength of the input signal's spectrum at the first search frequency; based on the computed metric, categorizing the first search frequency as a spur frequency or not a spur frequency.

Yet another aspect of the present disclosure provides a method for tracking and suppressing at least one spur in an input signal, the method comprising: rotating the input signal by a first tracked spur frequency to generate a first rotated signal; estimating a DC component of the first rotated signal to generate a first DC estimate; delaying the first DC estimate to generate a first delayed DC estimate; computing the cross-product of the first DC estimate and the first delayed DC estimate to generate a first cross product; filtering the first cross product with an IIR filter to generate a first filtered cross product; subtracting the first filtered cross product from a first spur frequency estimate to generate the first tracked spur frequency.

Yet another aspect of the present disclosure provides an apparatus for suppressing at least one frequency spur from an input signal, the apparatus comprising: a first rotator for rotating the input signal by a first frequency to generate a first rotated signal; an estimator for estimating a component of the first rotated signal corresponding to a first intermediate frequency to generate a first estimate; a first de-rotator for de-rotating the first estimate by the first frequency to generate a first de-rotated spur estimate; and a subtractor for subtracting the first de-rotated spur estimate from a signal derived from the input signal.

Yet another aspect of the present disclosure provides an apparatus for suppressing at least one frequency spur from an input signal, the apparatus comprising: a first rotator for rotating the input signal by a first frequency to generate a first rotated signal; a first estimator for estimating a component of the first rotated signal corresponding to a first intermediate frequency to generate a first estimate; a first subtractor for subtracting the first estimate from a signal derived from the first rotated signal to generate a first corrected signal; and a first de-rotator for de-rotating the first corrected signal by the first spur frequency to generate a first de-rotated corrected signal.

Yet another aspect of the present disclosure provides an apparatus for identifying the presence of spur frequencies in an input signal, the apparatus comprising: a spectral analyzer module for determining the strength of a spectral frequency component in the input signal; and a searcher block configured to specify a plurality of frequencies to the spectral analyzer, the spectral analyzer estimating the strength of each of said plurality of frequencies, the searcher block further configured to determine at least one spur frequency based on the estimated strengths of the plurality of frequencies.

Yet another aspect of the present disclosure provides an apparatus for suppressing frequency spurs from an input signal, the apparatus comprising: a spur searcher configured to identify at least one spur frequency in an input signal; a spur suppression module comprising a first rotator for rotating an input signal by a first spur frequency to generate a first rotated signal, a DC estimator for estimating a DC component of the first rotated signal, a first de-rotator for de-rotating the estimated DC component by the first spur frequency to generate a first de-rotated spur estimate, and a subtractor for subtracting the first de-rotated spur estimate from the first rotated signal; and a spur frequency tracker configured to generate the first spur frequency from the at least one spur frequency identified by the spur searcher.

Yet another aspect of the present disclosure provides an apparatus for suppressing at least one frequency spur from an input signal, the apparatus comprising: means for rotating the input signal by a first frequency to generate a first rotated signal; means for estimating a component of the first rotated signal corresponding to a first intermediate frequency to generate a first estimate; means for de-rotating the first estimate by the first frequency to generate a first de-rotated spur estimate; and means for subtracting the first de-rotated spur estimate from a signal derived from the input signal.

Yet another aspect of the present disclosure provides an apparatus for suppressing at least one frequency spur from an input signal, the apparatus comprising: means for rotating the input signal by at least one spur frequency to generate at least one rotated signal; means for estimating a DC component for each of the at least one rotated signal to generate at least one DC estimate; means for de-rotating the at least one DC estimate by the at least one spur frequency to generate at least one de-rotated spur estimate; and means for subtracting the at least one de-rotated spur estimate from a signal derived from the input signal.

Yet another aspect of the present disclosure provides an apparatus for suppressing at least one frequency spur from an input signal, the apparatus comprising: means for rotating the input signal by a first frequency to generate a first rotated signal; means for estimating a component of the first rotated signal corresponding to a first intermediate frequency to generate a first estimate; means for subtracting the first estimate from a signal derived from the first rotated signal to generate a first corrected signal; and means for de-rotating the first corrected signal by the first spur frequency to generate a first de-rotated corrected signal.

Yet another aspect of the present disclosure provides an apparatus for identifying the presence of spur frequencies in an input signal, the apparatus comprising: means for determining the strength of a spectral frequency component in the input signal; means for specifying a plurality of frequencies to the spectral analyzer; and means for identifying a spur frequency based on the output of said means for determining the strength of a spectral frequency component in the input signal.

Yet another aspect of the present disclosure provides a computer program product for identifying the presence of spur frequencies in an input signal, the product comprising: computer-readable medium comprising: code for causing a computer to provide a first search frequency; code for causing a computer to compute a metric associated with the strength of the input signal's spectrum at the first search frequency; code for causing a computer to, based on the computed metric, categorize the first search frequency as a spur frequency or not a spur frequency.

BRIEF DESCRIPTION OF DRAWINGS

FIG. 3B further depicts a parallel architecture to suppress multiple spurs $\omega_1$ through $\omega_N$ from a signal 200a.

DETAILED DESCRIPTION

According to the present disclosure, rotator-based techniques featuring rapid convergence time and enhanced frequency selectivity are provided for spur suppression. Also provided are techniques for searching for spur frequencies in a frequency spectrum, and for tracking such spur frequencies over time.

The techniques described herein may be used for various wireless communication systems such as a code division multiple access (CDMA) system, a time division multiple access (TDMA) system, a frequency division multiple access (FDMA) system, an orthogonal frequency division multiple access (OFDMA) system, an orthogonal frequency division multiplexing (OFDM) system, a single-carrier frequency division multiple access (SC-FDMA) system, and so on.

A CDMA system may implement one or more radio access technologies such as cdma2000, Wideband-CDMA (W-CDMA), and so on. cdma2000 covers IS-95, IS-2000, and IS-856 standards. A TDMA system may implement Global System for Mobile Communications (GSM). GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system utilizes OFDM.

An OFDM-based system transmits modulation symbols in the frequency domain whereas an SC-FDMA system transmits modulation symbols in the time domain. In general, the techniques described herein may be used for any communication system in which a spur to be suppressed occupies only a portion of the desired signal bandwidth. The techniques are especially applicable for wideband communications systems such as, e.g., CDMA and OFDM-based systems, or systems whose performance is particularly sensitive to the presence of even relatively weak spurs, such as Global Positioning Systems (GPS) and Galileo.

The techniques may be used for a wireless device as well as a base station in a wireless communication system. A base station is generally a fixed station that communicates with the wireless devices and may also be called a base transceiver system (BTS), a Node B, an access point, or some other terminology. A wireless device may be fixed or mobile and may also be called a mobile station, a user equipment, a terminal, a subscriber unit, or some other terminology. A wireless device may be a cellular phone, a personal digital assistant (PDA), a wireless modem card, and so on. The techniques may also be used in wireless broadcast systems such as MediaFLO.

Figure 1:
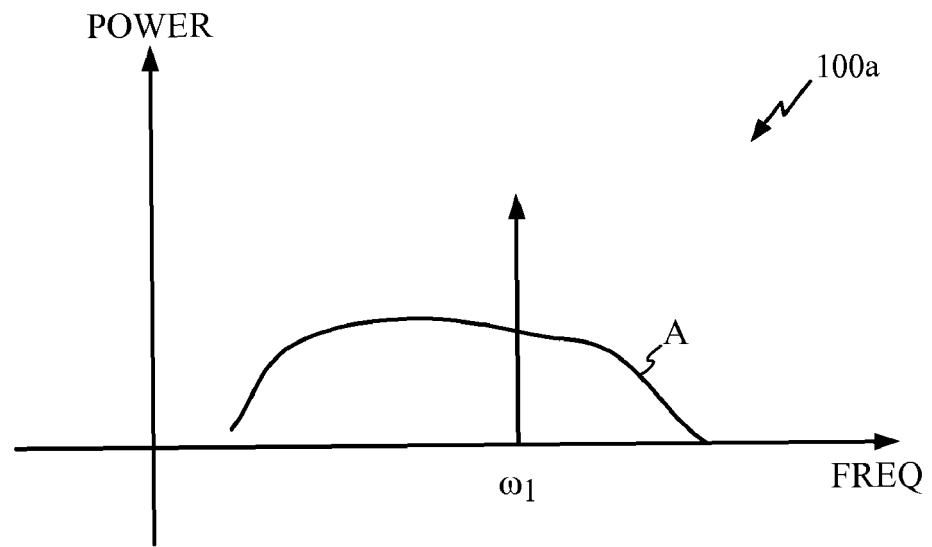
FIG. 1 illustrates a frequency spectrum 100a containing an instance of a desired signal A along with a single instance of a spur characterized by frequency $\omega_1$.
Figure 1A:
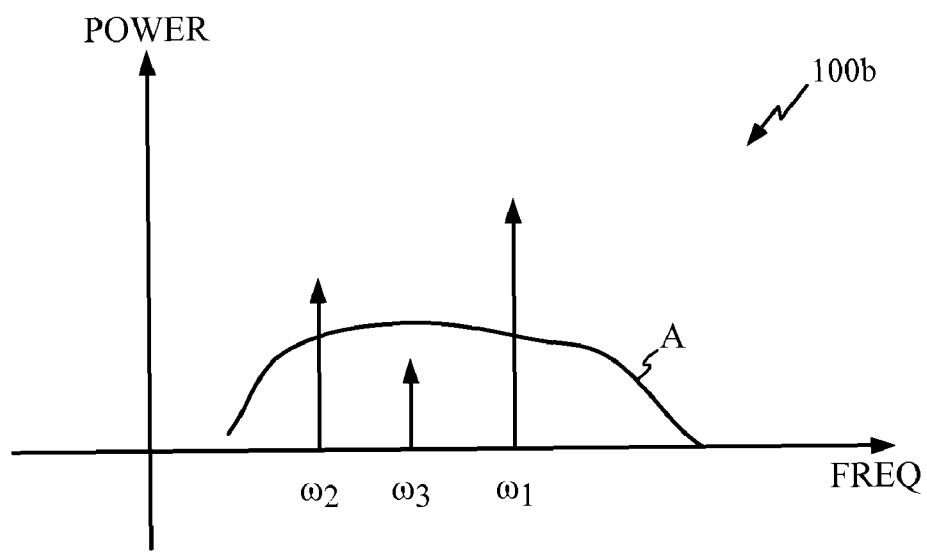
FIG. 1A illustrates another frequency spectrum 100b containing multiple spurs at frequencies $\omega_1$, $\omega_2$, $\omega_3$.

FIG. 1 illustrates a frequency spectrum 100a containing an instance of a desired signal A along with a single instance of a spur characterized by frequency $\omega_1$. FIG. 1A illustrates another frequency spectrum 100b containing multiple spurs at frequencies $\omega_1$, $\omega_2$, $\omega_3$. Note the desired signal A is expected to have a bandwidth greater than the bandwidth of any single spur. For example, the desired signal A may be a cdma2000 spread spectrum signal having a bandwidth of 1.23 MHz, while a spur may have a bandwidth on the order of a few kHz or less, or be a continuous-wave (CW) signal, e.g., a harmonic waveform having close to zero bandwidth.

Figure 2:
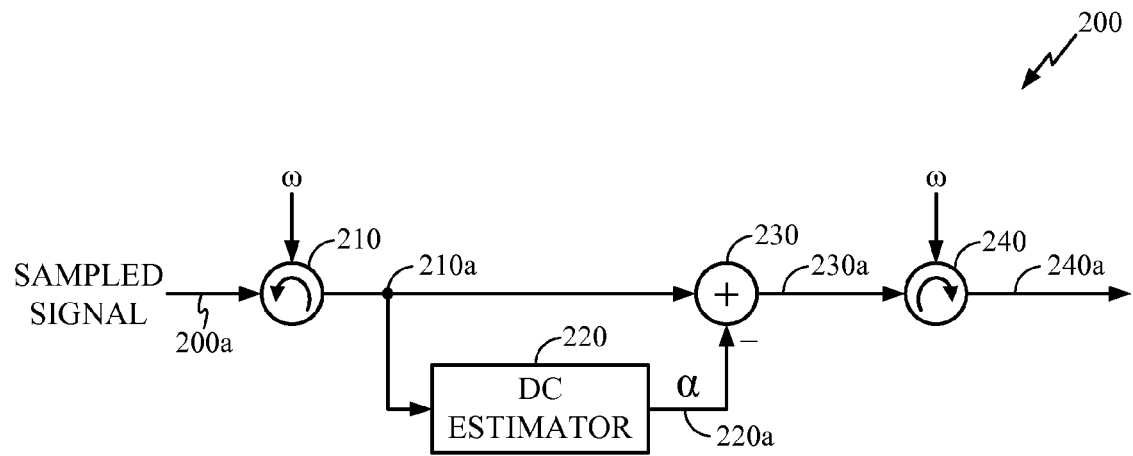
FIG. 2 depicts an embodiment of a spur suppressor 200 for suppressing a single spur from an input signal 200a according to the present disclosure.

FIG. 2 depicts an embodiment of a spur suppressor 200 for suppressing a single spur from an input signal 200a according to the present disclosure. For example, the input signal 200a may correspond to a signal having the spectrum 100a shown in FIG. 1. Unless otherwise noted, in this specification and in the claims, all signals referred to may generally be complex signals having both in-phase (I) and quadrature (Q) components. Accordingly, the computation blocks described, including rotators, subtractors, estimators, etc., may generally be capable of processing complex input and output signals.

In FIG. 2, the input signal 200a is shown rotated by a sinusoidal signal having complex frequency ω using a rotator 210. The rotator 210 is depicted with a counter-clockwise arrow, which is meant to indicate rotation, while the operation depicted with a clockwise arrow (e.g., corresponding to block 240 in FIG. 2) is meant to indicate de-rotation. In this specification and in the claims, the terms "rotation" and "de-rotation" denote multiplication by a complex sinusoid and multiplication by the complex conjugate of that complex sinusoid, respectively. Note the term "rotation," as used in this specification, can refer to shifting a signal in frequency in either a positive direction or a negative direction depending on the context, while the term "de-rotation" used in conjunction with such a "rotation" will refer to shifting the signal in frequency in the opposite direction from the corresponding rotation. For example, if in one context, a "rotation" shifts a frequency in a negative direction, e.g., from a positive frequency ω1 to 0, then the corresponding "de-rotation" would shift a frequency in a positive direction, e.g., from 0 to a positive frequency ω1. Likewise, if in another context, a "rotation" shifts a frequency in a positive direction, e.g., from a negative frequency ω2 to 0, then the corresponding "de-rotation" would shift a frequency in a negative direction, e.g., from 0 to a negative frequency ω2. If the direction in which a rotation shifts a signal is unspecified, then the term will be understood to generally encompass any frequency shift, positive or negative.

In FIG. 2, the complex frequency ω used for rotation may be chosen to correspond to a spur frequency, e.g., the frequency $\omega_1$ associated with the spur shown in FIG. 1. Assuming the spur frequency is positive, the operation of rotator 210 shifts the entire spectrum of the input signal 200a in the negative direction such that the spur originally centered at ω is now centered at DC, i.e., zero-frequency.

In an embodiment, the value of ω may be derived using the spur searching and/or tracking algorithms described later hereinbelow with reference to FIGS. 4-6. In alternative embodiments, the value of ω may be derived using any algorithm for identifying a frequency associated with a spur known to one of ordinary skill in the art. In yet another embodiment, the value of ω may be programmed with a fixed predetermined frequency, assuming the spur frequency is known a priori.

One of ordinary skill in the art will realize that there are many well-known techniques for implementing the operation of complex frequency rotation. In an embodiment, any complex multiplier for multiplying two complex signals may be used, with the phase of the operands appropriately chosen depending on whether the operation is a rotation or de-rotation. In an embodiment, the complex frequency rotation may be implemented using the CORDIC (coordinate rotation digital computer) algorithm well-known to one of ordinary skill in the art. These and other embodiments are contemplated to be within the scope of the present disclosure.

Returning to FIG. 2, the output signal 210a of the rotator 210 is provided to a DC estimator 220, which outputs a (complex) estimate α, or 220a, of the DC value of the rotated signal 210a. As earlier noted, the rotated signal 210a is expected to contain the spur corresponding to ω centered at DC, and thus the DC estimator 220 is expected to estimate the value of the complex envelope of the spur originally at frequency ω.

One of ordinary skill in the art will realize that there are many well-known techniques for implementing the operation of DC estimation. In an embodiment, a simple block averaging technique may be used, wherein the last N samples of the complex signal 210a are averaged, and the result held constant as the signal 220a for the subsequent N samples. In another embodiment, a moving average filter may be used, wherein the last N samples of the complex signal 210a are averaged sample by sample, and the result output as the signal 220a. In yet another embodiment, any low-pass filter with a low enough bandwidth may be used to obtain a DC estimate. Such low-pass filters may generally include finite-impulse response (FIR) filters or infinite-impulse response (IIR) filters. For example, in an IIR filter implementation, the last N samples of the complex signal 210a may be averaged with an effective time constant, and the result output as the signal 220a. These and any other techniques for DC estimation known to one of ordinary skill in the art are contemplated to be within the scope of the present disclosure.

FIG. 2 further shows that the DC estimate 220a is subtracted from the rotated signal 210a by subtractor 230. The subtractor output 230a is de-rotated by the frequency ω using de-rotator 240. One of ordinary skill in the art will appreciate that the original input signal 200a is recovered as processed signal 240a, minus the components corresponding to spur frequency ω as estimated by DC estimator 220. Note that to perform accurate subtraction of the DC estimate from the original signals, one of ordinary skill in the art may design the complex frequency rotation and de-rotation operations to keep the phase of the rotated and de-rotated signals aligned with the phase of the original signal.

Figure 2A:
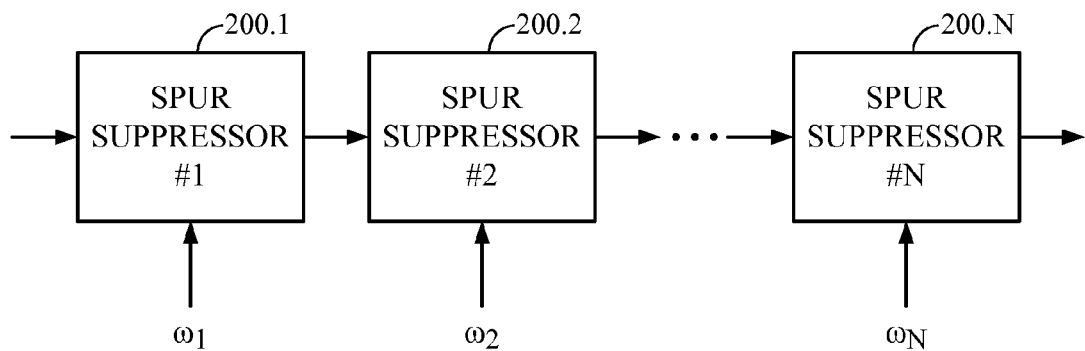
FIG. 2A depicts an embodiment of the present disclosure wherein multiple instances of the spur suppressor 200 are concatenated in series as blocks 200.1, 200.2, . . . , 200.N for suppressing a plurality of spurs $\omega_1$ through $\omega_N$.

Note the embodiment depicted in FIG. 2 may be readily modified to suppress multiple spurs within a signal. FIG. 2A depicts an embodiment of the present disclosure wherein multiple instances of the spur suppressor 200 are concatenated in series as blocks 200.1, 200.2, . . . , 200.N for suppressing a plurality of spurs $\omega_1$ through $\omega_N$. Each of the spur suppressors 200.1 through 200.N may be designed according to the principles described herein with reference to FIG. 2.

Returning to the embodiment of FIG. 2, note there may generally be a delay present in the DC estimate 220a computed for the signal 210a. For example, assuming the DC estimator 220 employs the aforementioned block averaging scheme with block size $N_{block}$, then the DC estimate 220a subtracted from any single sample of 210a by subtractor 230 will be computed from the previous block of $N_{block}$ samples, rather than the current sample of 210a present at the input to subtractor 230. This delay may result in an inaccuracy in the spur estimation, depending on the amount of delay between the current sample and the actual samples used to perform the DC estimation. Furthermore, if the total length of a data burst is short relative to the delay, then by the time a DC estimate is calculated for a received signal of a data frame, the data frame may already have been terminated.

In a communication system wherein data is continuously transmitted over a single uplink or downlink channel, data may be continuously received with a long enough duration such that the delay associated with the DC estimate is negligible. Examples of such systems include CDMA and W-CDMA.

Figure 2B:
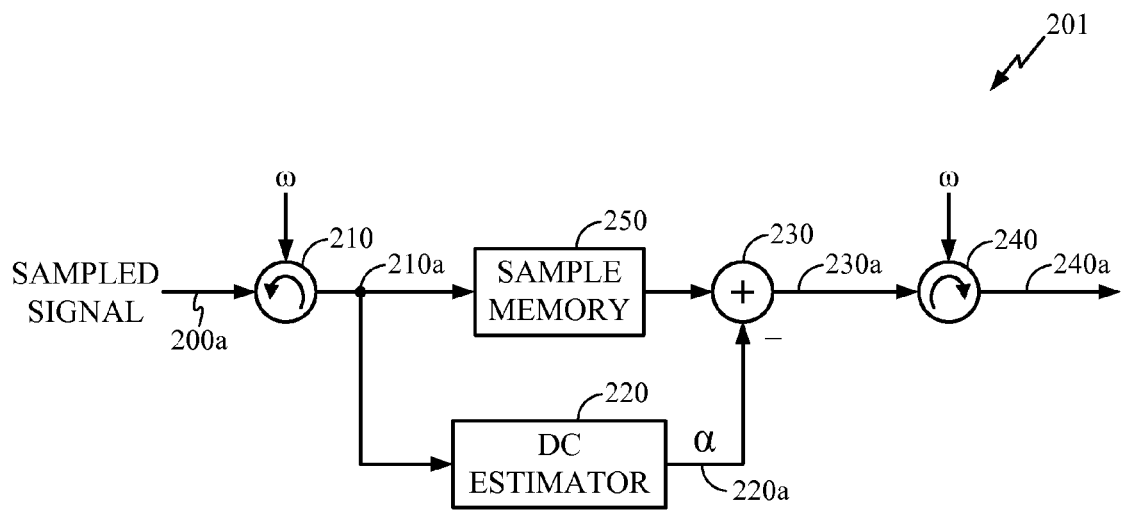
FIG. 2B depicts an embodiment of a spur suppressor employing a sample memory to delay incoming samples for further processing.

On the other hand, for systems wherein the length of a burst of sample values 200a is comparable to the delay of the DC estimator, a sample memory may be provided as shown for the spur suppressor 201 of FIG. 2B. In FIG. 2B, sample values 210a are provided to a sample memory 250, which is programmed to store and delay the sample values 210a by a fixed delay. For example, if DC estimator 220 employs a block averaging scheme with block size $N_{block}$, then the sample memory 250 may store $N_{block}$ samples of the signal 210a, and provide them to the subtractor 230 when the DC estimate 220a associated with the stored $N_{block}$ samples is available. In this way, the subtraction of the DC estimate 220a may be synchronized with the segment of signal 210a used for the DC estimation.

One of ordinary skill in the art will realize that multiple instances of the spur suppressor 201 of FIG. 2B may also be concatenated in series (not shown) to suppress a plurality of spurs, in a manner analogous to the way in which multiple instances of the spur suppressor 200 of FIG. 2 are concatenated in series as shown in FIG. 2A.

The embodiment described with reference to FIG. 2B may readily accommodate communication systems wherein data is received over limited bursts of time, e.g., a time division multiple access (TDMA) system such as GSM. The embodiment of FIG. 2B may also be applied to any other communications systems.

In alternative embodiments, the complex rotator shown need not shift the signal containing the spur frequency to DC. For example, in an embodiment, the rotator may instead shift the signal containing the spur frequency to half the digital sampling frequency of the system. In that case, the spur component could be estimated using a digital π-frequency estimator, e.g., a module that multiplies successive samples by a sequence such as 1, −1, 1, −1, etc., before summing the multiplied samples to estimate the value of the component at digital frequency π (where 2π would correspond to the digital sampling frequency). One of ordinary skill in the art will realize that according to the present disclosure, the complex rotator may generally shift the signal containing the spur frequency to any intermediate frequency, and perform complex estimation of the frequency component at that intermediate frequency. The estimated frequency component may then be suppressed from the original signal using the techniques of the present disclosure. Such embodiments are contemplated to be within the scope of the present disclosure.

Figure 3:
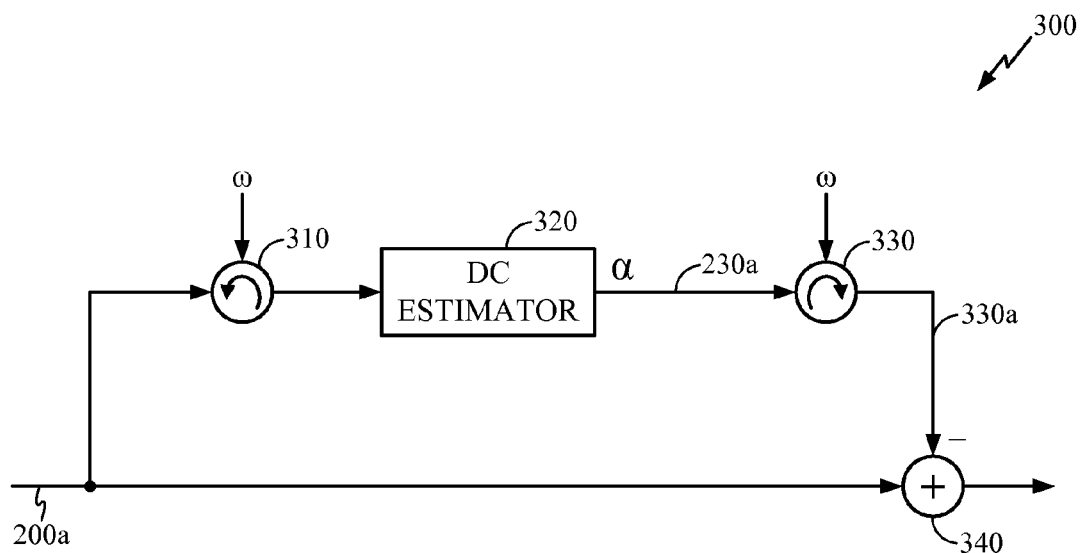
FIG. 3 depicts an embodiment of a spur suppressor 300 that subtracts an estimated spur from the input signal at the original spur frequency.

Alternative implementations of a spur suppressor are further described herein. FIG. 3 depicts an embodiment of a spur suppressor 300 that subtracts an estimated spur from the input signal at the original spur frequency. In FIG. 3, the input signal 200a is rotated by spur frequency ω using rotator 310, and the DC component α, or 320a, of the signal 310a is computed by DC estimator 320. Signal 320a is then de-rotated by frequency ω using de-rotator 330, before being subtracted from the original signal 200a by subtractor 340.

Note the architecture of spur suppressor 300 differs from that of spur suppressor 200 shown in FIG. 2 in that subtraction of the spur is done at the de-rotated (original) frequency rather than at the rotated frequency.

Figure 3A:
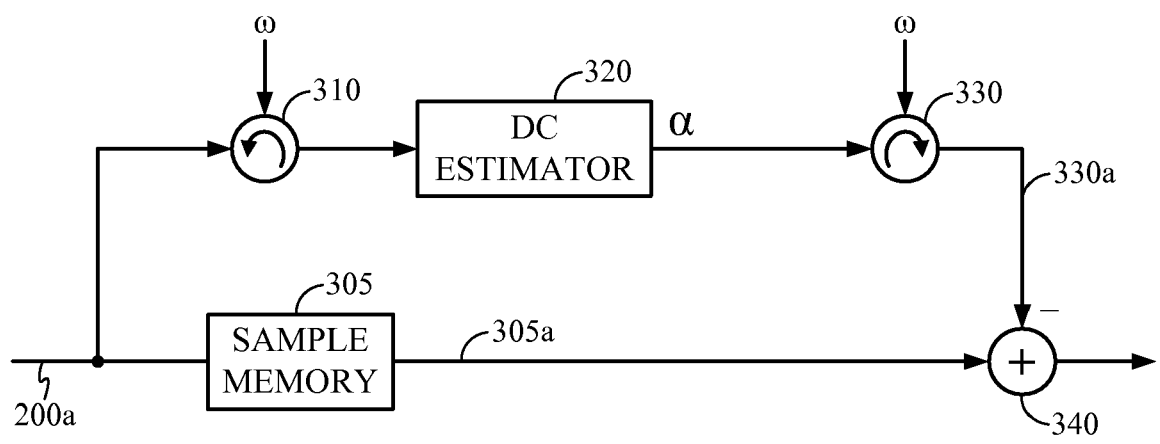
FIG. 3A depicts an embodiment of a spur suppressor 300 employing a sample memory 305.

Note a sample memory 305 such as depicted in FIG. 3A may also be provided for the embodiment of FIG. 3 to account for delays in the system.

Figure 3B:
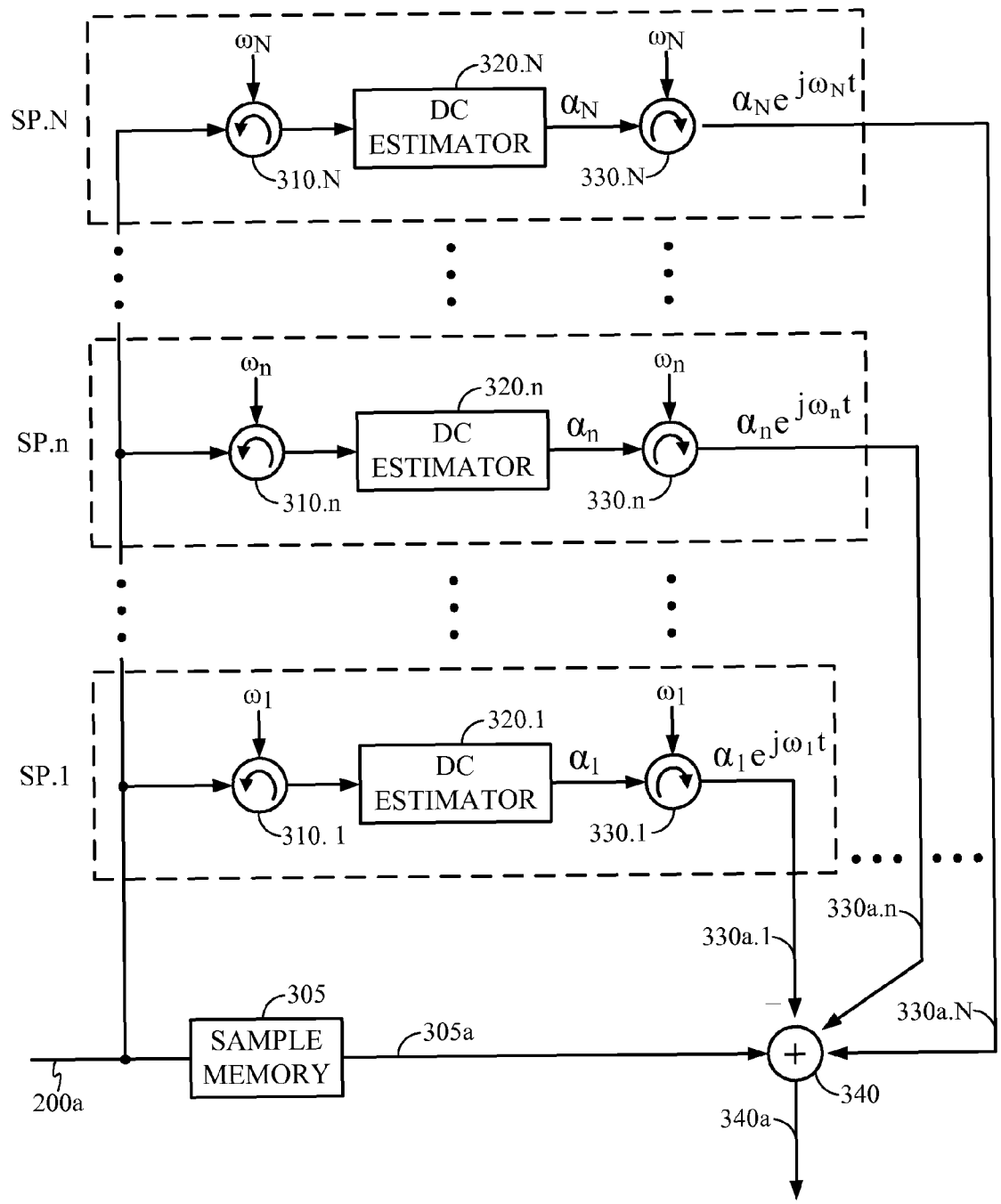

FIG. 3B further depicts a parallel architecture to suppress multiple spurs $\omega_1$ through $\omega_N$ from an input signal 200a. In FIG. 3B, a spur estimation path labeled SP.n is provided for each of spurs $\omega_1$ through $\omega_N$, wherein n is a spur index ranging from 1 to N. Each spur estimation path SP.n generates a signal 330a.n that corresponds to a reconstructed, de-rotated version of spur $\omega_n$. Note as the DC estimates 320a.n are all de-rotated by their respective spur frequencies con, the spur estimates 330a.1 through 330a.N may be simultaneously subtracted from the original (delayed) signal 305a using subtractor 340 to generate the corrected signal 340a.

One of ordinary skill in the art will realize that the parallel architecture of FIG. 3B incurs no additional signal path delay for each additional spur to be suppressed, in contrast with a serial architecture such as that depicted in FIG. 2A. One of ordinary skill in the art will also note that, in an embodiment, spur suppressor 300 may be concatenated in series as depicted in FIG. 2A for spur suppressor 200, and such an embodiment is also contemplated to be within the scope of the present disclosure.

Techniques for suppressing spurs having known spur frequencies from a given signal have been disclosed hereinabove. Further disclosed hereinbelow are techniques to identify unknown spur frequencies by searching for and tracking spurs in an input signal.

Figure 4:
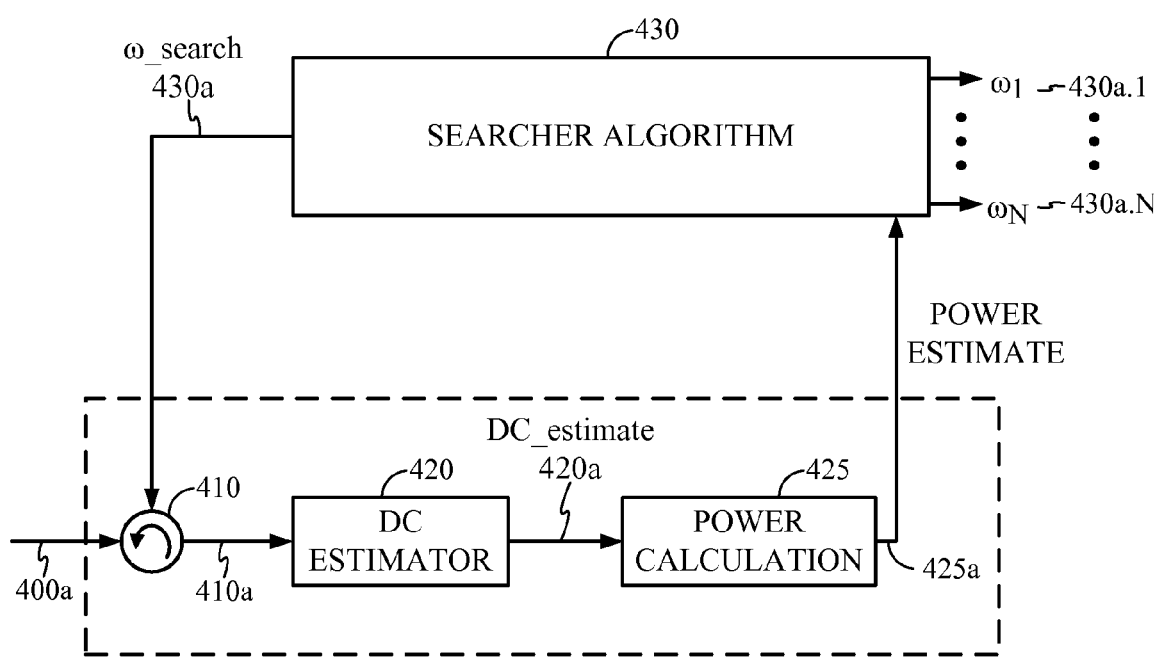
FIG. 4 depicts an embodiment of a spur searcher 400.

FIG. 4 depicts an embodiment of a spur searcher. In FIG. 4, an input signal 400a containing spurs of unknown frequency are provided to a single frequency spectral analyzer 400. The single frequency spectral analyzer 400 calculates the power present at a given frequency ω_search within the signal 400a. In the embodiment of the single frequency spectral analyzer shown in FIG. 4, the signal 400a is rotated using a rotator 410 by a candidate frequency ω_search, or 430a, provided by a searcher algorithm block 430. A DC estimator 420 estimates the DC component of the rotated signal 410a. The DC estimate 420a is then provided to a power calculation block 425, which calculates the power 425a of DC estimate 420a. One of ordinary skill in the art will appreciate that while power is the metric used to estimate the strength of the candidate spurs in FIG. 4, any other suitable metric may also be used, e.g., amplitude. Embodiments utilizing such other metrics are contemplated to be within the scope of the present disclosure.

The power estimate 425a is provided back to the searcher algorithm block 430. The searcher algorithm block thereafter generates a new candidate frequency ω_search, and again receives a corresponding power estimate 425a from single frequency spectral analyzer 400.

By sweeping through a suitable range of candidate frequencies ω_search, noting the corresponding power estimates, and applying a suitable candidate selection algorithm to the noted power estimates, the searcher algorithm block 430 may output frequencies $\omega_1$ through $\omega_N$, or 430a.1 through 430a.N, corresponding to the candidate frequencies deemed most likely to be spur frequencies. Such output frequencies may then be provided to a spur suppression module, such as previously described with reference to FIGS. 2-3. In alternative embodiments, the output frequencies may generally be provided to any spur suppression module for spur suppression.

In an alternative embodiment (not shown), a spur searcher may instead incorporate a Fast-Fourier Transform (FFT) module as an alternative to the rotator-based module 400 depicted in FIG. 4. In such an FFT-based searcher (not shown), an FFT may be computed based on a segment of the input signal 400a. The FFT may compute the amplitude or power present in the signal 400a at a plurality of frequency points associated with the FFT. This spectral content information may then be provided to a suitable searcher algorithm block 430 to identify spurs.

Figure 5:
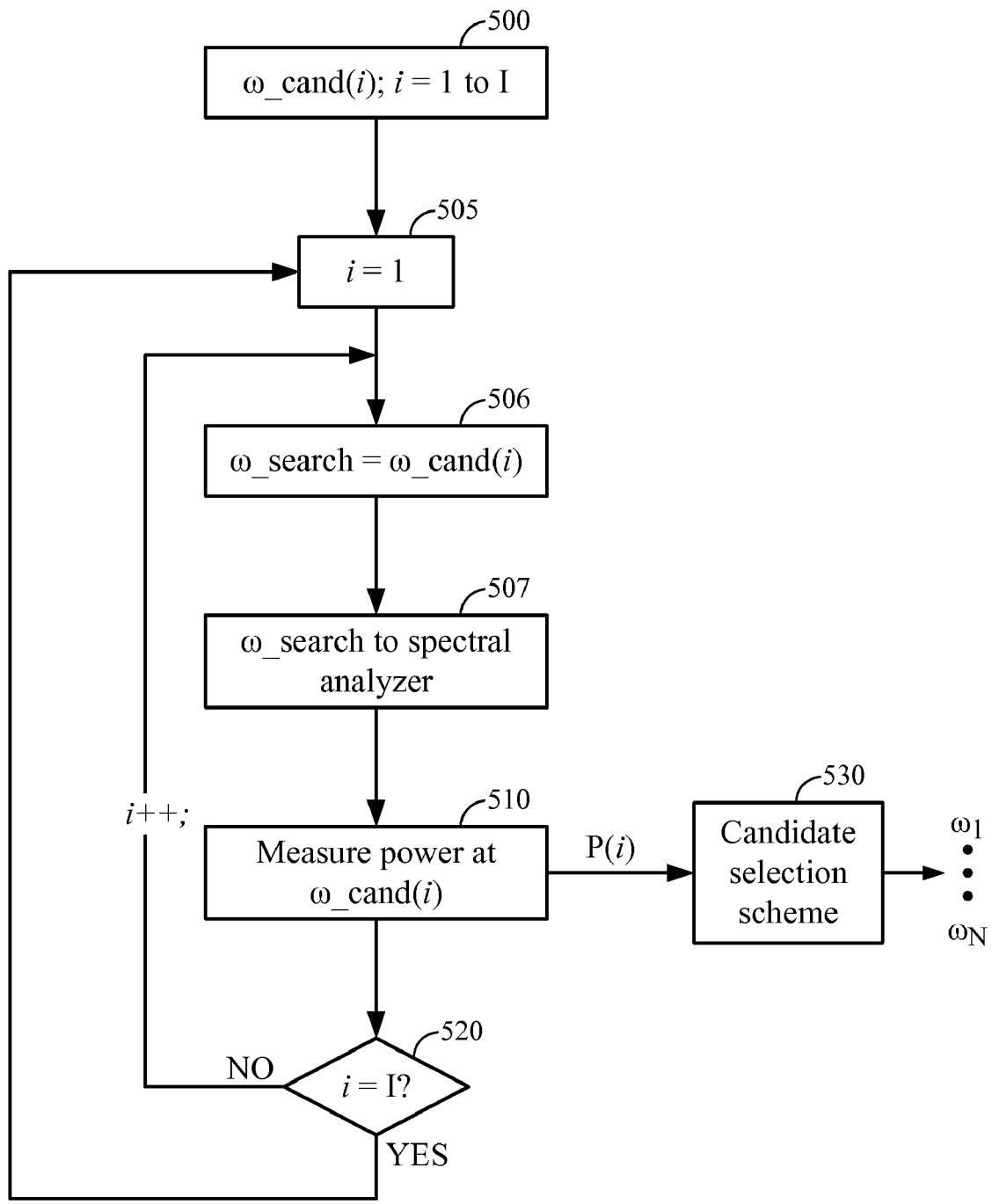
FIG. 5 depicts an embodiment of a frequency search algorithm that may be implemented as part of the searcher algorithm block 430 of FIG. 4.

FIG. 5 depicts an embodiment of a frequency search algorithm that may be implemented as part of the searcher algorithm block 430 of FIG. 4. In FIG. 5, a plurality of candidate frequencies ω_cand(i) to be evaluated is chosen at step 500, wherein i is an index ranging from 1 to a maximum I. In an embodiment, the candidate frequencies ω_cand(i) may be chosen to uniformly span the total bandwidth of a desired signal. At step 505, the index i is initialized to 1. At step 506, ω_search is set equal to ω_cand(i). At step 507, ω_search is supplied to a spectral analyzer, such as described with reference to block 400 in FIG. 4. At step 510, the measured power P(i) corresponding to ω_cand(i) is provided to a candidate selection scheme 530. Candidate selection scheme 530 outputs a list of spur frequencies $\omega_1$ through $\omega_N$ according to a predetermined algorithm, an embodiment of which is described in FIG. 6. After step 510, the index i is evaluated against the maximum index I at step 520, which determines whether i is to be incremented to evaluate the next frequency ω_cand(i+1), or whether i is to be looped back to step 505.

Note the frequency searching operations depicted in FIG. 5 are provided as an illustration only, and are not meant to limit the scope of the present disclosure to any particular frequency search algorithm. One of ordinary skill in the art may readily derive alternative frequency search schemes.

Figure 6:
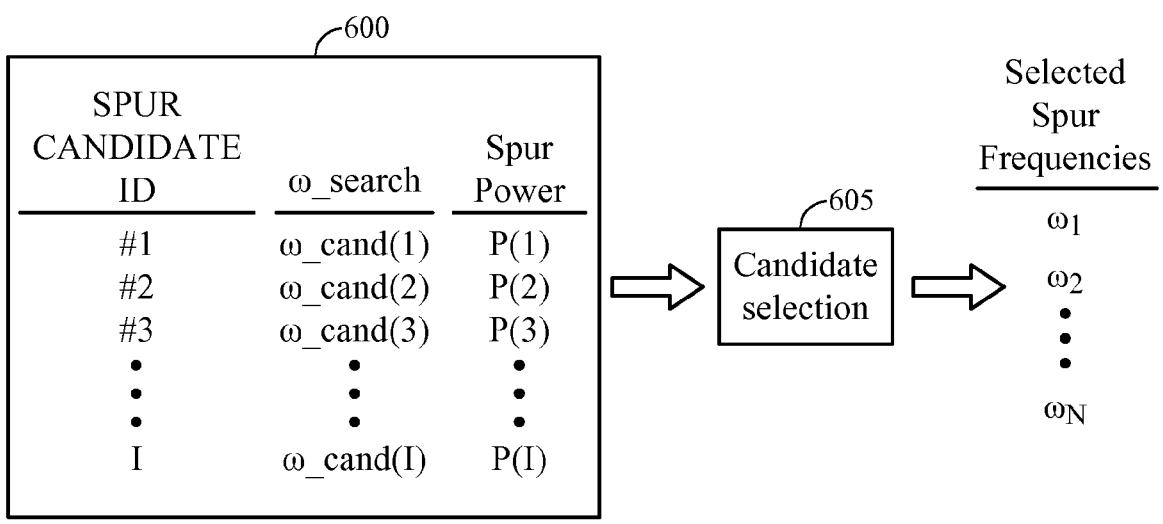
FIG. 6 illustrates the functionality of a candidate selection scheme 530.

FIG. 6 illustrates the functionality of a candidate selection scheme 530. The selection scheme may store each candidate frequency ω_cand(i) and corresponding P(i) in a table 600. Candidate selection block 605 may select a subset N determined to be spur frequencies from the set of candidate frequencies I, the subset N including spur frequencies $\omega_1$ through $\omega_N$. One of ordinary skill in the art will realize that there are many possible ways to implement candidate selection block 605. For example, in an embodiment, only candidate spur frequencies ω_cand(i) having a corresponding power level P(i) greater than a predetermined threshold Thresh are declared spur frequencies. Note the present disclosure is not limited to any particular embodiment of candidate selection block 605, and one of ordinary skill in the art will appreciate that other embodiments may employ alternative criteria and techniques to select and/or rank candidate frequencies for further processing.

Note the embodiment of the searcher algorithm depicted in FIGS. 5 and 6 is provided for illustration only. One of ordinary skill in the art may readily derive other techniques for sweeping through, identifying, and/or ranking preferred spur frequencies given an arbitrary list of candidate frequencies and corresponding measured amplitude or power levels.

Note the searcher architecture and algorithm described with reference to FIGS. 4 and 5 correspond to a serial searching architecture, i.e., the power corresponding to each possible candidate frequency is evaluated one after another, in seriatim. In an embodiment, the single frequency spectral analyzer may be substituted with a multiple frequency spectral analyzer to simultaneously measure the power of a plurality of frequencies on each run. Such a multiple frequency spectral analyzer may include, e.g., multiple instances of the rotator 410, DC estimator 420, and power calculator 425 coupled in parallel. One of ordinary skill in the art may make appropriate modifications to the searcher algorithm of FIG. 5 to accommodate such an architecture. Note the choice between parallel and serial implementations of the searcher effectively trades off hardware complexity (multiple instances of rotators, etc., required) for evaluation time (faster speed). Embodiments of spur searchers utilizing serial, parallel, and/or combinations of serial and parallel architectures are all contemplated to be within the scope of the present disclosure.

In an embodiment of the present disclosure, the candidate frequencies to be evaluated may be uniformly distributed across the spectrum corresponding to a desired signal. For example, if a desired signal has a bandwidth of 1 MHz, candidate spur frequencies may be searched across the entire signal bandwidth in 1 kHz increments, i.e., a spur frequency resolution of 1 kHz. In this case, the searcher may be called on to evaluate up to 1 MHz/1 kHz=1000 candidate frequencies. To minimize search time and/or hardware complexity, it is generally desired to minimize the number of candidate frequencies to be searched. However, to determine the actual value of each spur frequency with accuracy, it is desired to maximize the number of candidate frequencies to achieve greater frequency resolution.

Further disclosed hereinbelow are efficient techniques to track spur frequencies to arbitrary precision given an initial coarse estimate of each spur frequency. These tracking techniques allow minimizing search time while estimating and tracking spur frequencies with arbitrary precision.

Figure 7:
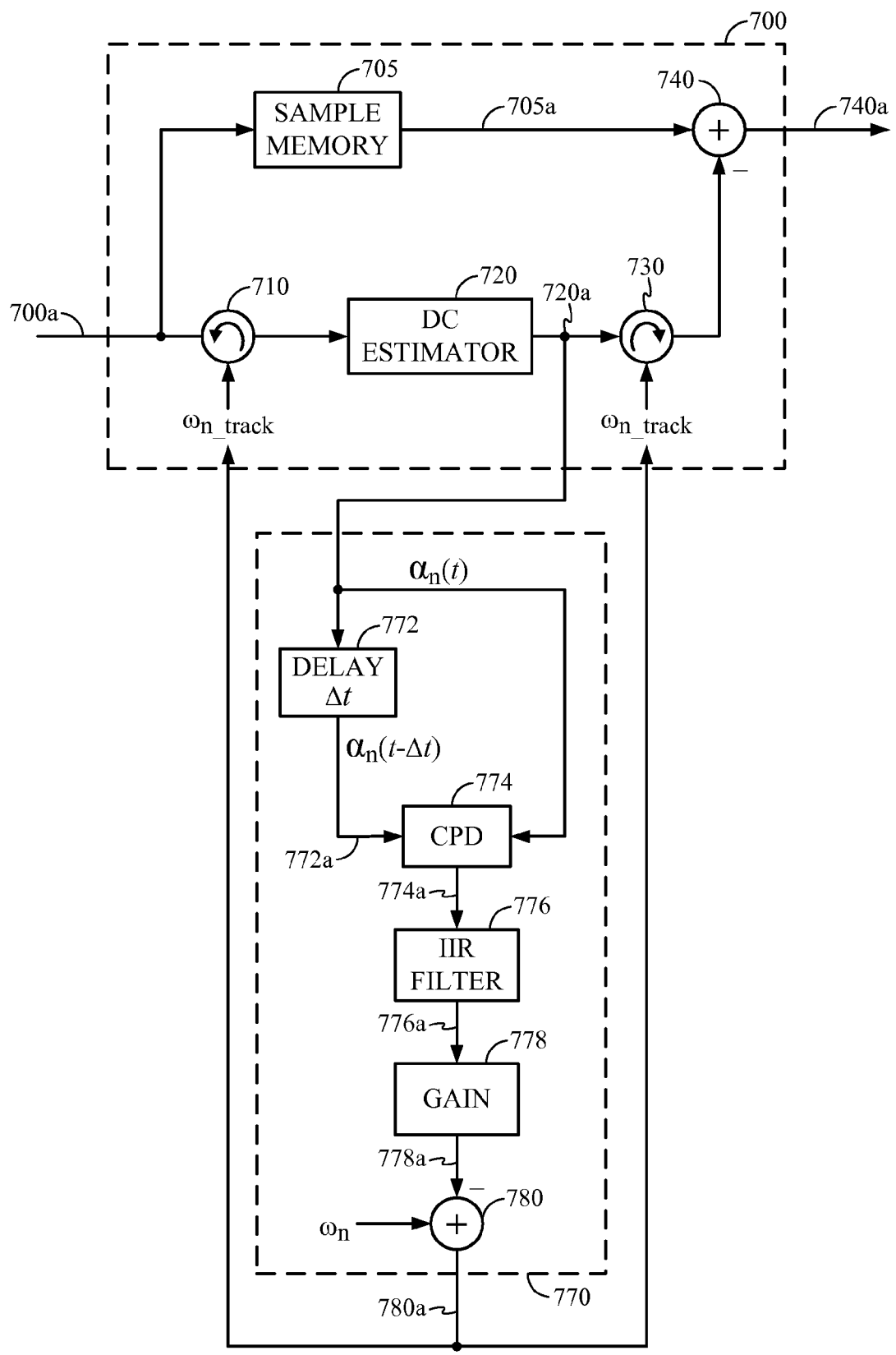
FIG. 7 depicts an embodiment of a spur frequency tracking scheme according to the present disclosure.

FIG. 7 depicts an embodiment of a spur frequency tracking scheme according to the present disclosure. In FIG. 7, a spur suppressor 700 is provided to suppress spurs of frequency $\omega_n$_track from an input signal 700a. The architecture of spur suppressor 700 corresponds to that of the embodiment shown in FIG. 3A. Note in alternative embodiments, spur suppressors employing any of the architectures described hereinabove may be used. The actual value of the frequency $\omega_n$_track supplied to rotator 710 and de-rotator 730 of spur suppressor 700 is generated by a frequency tracking block 770, whose operation is described hereinbelow.

Frequency tracking block 770 inputs from DC estimator 720 a complex DC estimate 720a having both in-phase (I) and quadrature (Q) components. In this specification, the signal 720a is alternatively denoted as $\alpha_n(t)$, wherein n is an index to the spur, and t is the time at which the signal 720a is sampled. Delay block 772 delays signal 720a by a time delay Δt to generate an output $\alpha_n(t-\Delta t)$, or 772a. The signals $\alpha_n(t)$ and $\alpha_n(t-\Delta t)$ are input to a cross-product detector (CPD) block 774, which performs the following function on the inputs to produce an output y, or 774a in FIG. 7 (Equation 1):

$$y = \alpha_n(t)_I * \alpha_n(t-\Delta t)_Q - \alpha_n(t)_Q * \alpha_n(t-\Delta t)_I;$$

wherein $X_I$ and $X_Q$ represent the I and Q components, respectively, of a complex signal X.

The signal 774a is filtered by an infinite impulse response (IIR) filter 776. In an embodiment, the IIR filter may be characterized by the following equation (Equation 2):

$$y_{IIR}(p) = \beta x_{IIR}(p) + (1-\beta) y_{IIR}(p-1);$$

wherein p is a discrete time index, $x_{IIR}$ is the IIR filter input, $y_{IIR}$ is the IIR filter output, and β is a loop gain constant (less than 1) that can be adjusted to vary the response time of the tracking loop to trade off tracking speed for accuracy.

The output 776a of the IIR filter 776 may be further multiplied by a scaling gain 778 to produce a signal 778a. The signal 778a is subtracted from a frequency $\omega_n$ by subtractor 780. In an embodiment, the frequency $\omega_n$ may be a coarse spur frequency estimate supplied from a searcher such as depicted in FIGS. 4-6. The output 780a of the subtractor 780 is supplied to the rotators 710 and 740 in spur suppressor 700 as the tracked spur frequency $\omega_n$_track.

In an embodiment, the DC estimator 420 of the searcher shown in FIG. 4 may employ a block-averaging filter with a block size $N_{block}$ much smaller than a block size $N_{block}$ employed for the DC estimator 720 in the frequency tracking loop shown in FIG. 7. This may be done so that the frequency resolution for the searcher may be coarser than the frequency resolution for the frequency tracking loop, to enable faster searching times.

In an embodiment comprising a plurality of spur suppressors, such as depicted in FIGS. 2A and 3B, one of ordinary skill in the art will appreciate that an instance of tracking block 770 may be provided for each spur suppressor, to track each of the plurality of spurs detected (by, e.g., a searcher) in the signal 770a.

Figure 8:
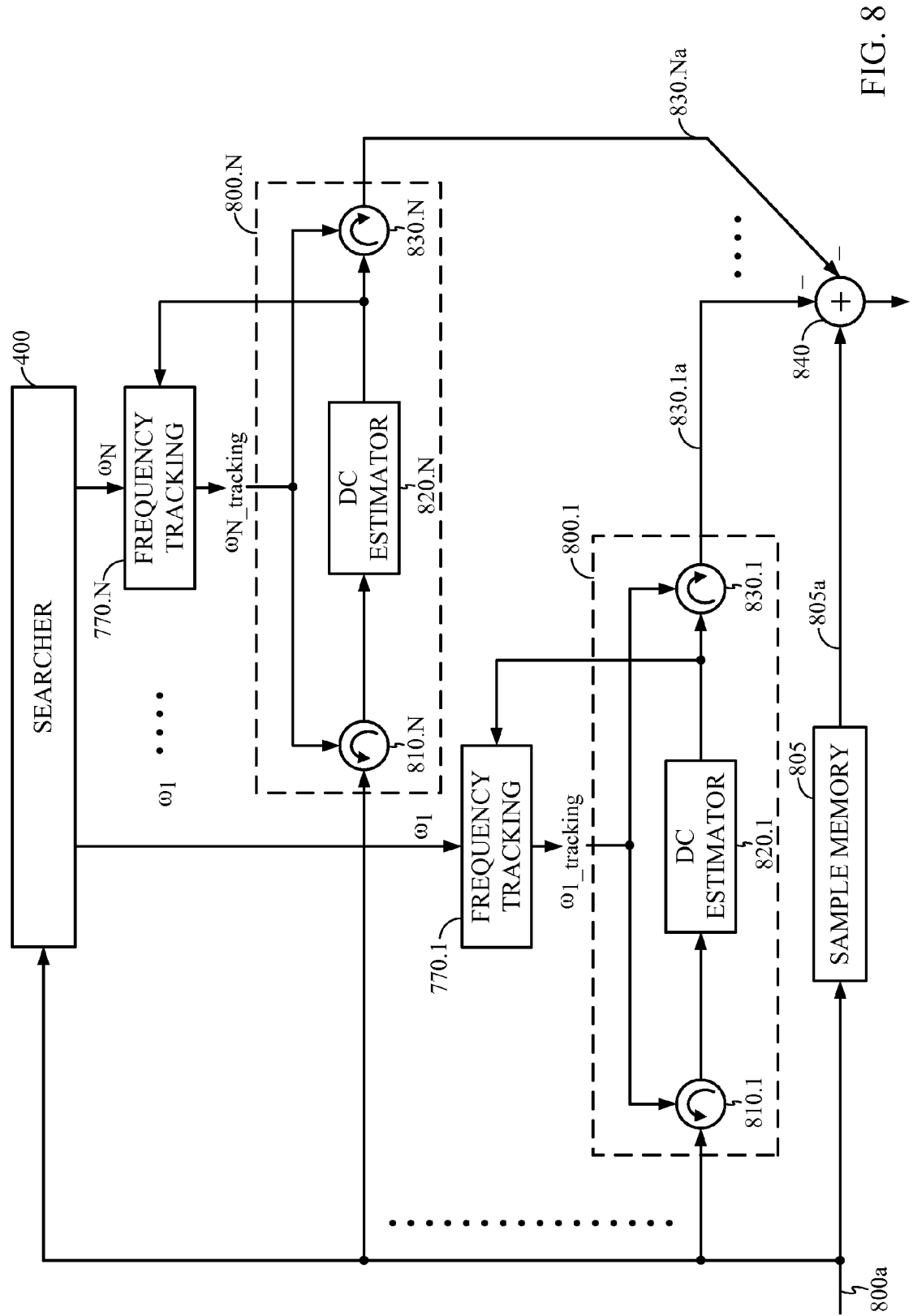
FIG. 8 depicts an embodiment of a spur detector/suppressor 800 employing a plurality of the techniques disclosed herein.

FIG. 8 depicts an embodiment of a spur detector/suppressor 800 employing a plurality of the techniques disclosed hereinabove. The embodiment in FIG. 8 employs a plurality of spur suppressors 800.1 through 800.N for suppressing spurs from an input signal 800a, coupled in parallel as described with reference to FIG. 3B above. A sample memory 805 is provided to delay the incoming samples 800a so that they are synchronized with the spur estimates. A searcher 400 identifies a plurality of spur frequencies $\omega_1$ through $\omega_N$ with coarse precision, and provides these frequency estimates to the tracking blocks 770.1 through 770.N. Each tracking block 770.n is configured to dynamically track each spur frequency, as described with reference to FIG. 7. The outputs of the spur suppressors 830.1a through 803.Na are subtracted from the delayed signal 805a by subtractor 840. In light of the principles described hereinabove, the operation of the embodiment shown in FIG. 8 will be clear to one of ordinary skill in the art. Note the embodiment is shown for illustrative purposes only, and is not meant to limit the scope of the present disclosure to the particular embodiment depicted in FIG. 8.

Based on the teachings described herein, it should be apparent that an aspect disclosed herein may be implemented independently of any other aspects and that two or more of these aspects may be combined in various ways. In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

A number of aspects and examples have been described. However, various modifications to these examples are possible, and the principles presented herein may be applied to other aspects as well. These and other aspects are within the scope of the following claims.

The invention claimed is:

1. A method for suppressing at least one frequency spur from an input signal, the method comprising:
   rotating the input signal by a first frequency to generate a first rotated signal;
   estimating a component of the first rotated signal corresponding to a first intermediate frequency, wherein the estimated component includes a digital $\pi$-frequency component of the first rotated signal;
   de-rotating the estimated component by the first frequency to generate a first de-rotated spur estimate;
   subtracting the first de-rotated spur estimate from a signal derived from the input signal.

2. The method of claim 1, the first frequency being a first spur frequency corresponding to a first spur, the estimating a component of the first rotated signal comprising estimating a DC component of the first rotated signal, the first intermediate frequency being DC.

3. The method of claim 2, the estimating a DC component comprising performing block averaging.

4. The method of claim 2, the estimating a DC component comprising using a moving average.

5. The method of claim 2, the estimating a DC component comprising low-pass filtering.

6. The method of claim 2, further comprising:
   rotating the input signal by a second spur frequency to generate a second rotated signal;
   estimating a DC component of the second rotated signal to generate a second DC estimate;
   de-rotating the second DC estimate by the second spur frequency to generate a second de-rotated spur estimate; and
   subtracting the second de-rotated spur estimate from the signal derived from the input signal.

7. The method of claim 1, the signal derived from the input signal comprising a signal delayed versus the input signal by a predetermined delay.

8. The method of claim 7, the predetermined delay being a delay associated with the delay of the first estimate.

9. The method of claim 1, the signal derived from the input signal being the input signal.

10. The method of claim 1, the rotating the input signal comprising performing a complex multiplication between the input signal and a complex frequency signal.

11. The method of claim 10, the performing a complex multiplication comprising using the CORDIC algorithm.

12. The method of claim 1, the input signal comprising a received signal from a time slot of a slotted-time communications system.

13. A method for suppressing at least one frequency spur from an input signal, the method comprising:

rotating the input signal by a first frequency to generate a first rotated signal;

estimating a component of the first rotated signal corresponding to a first intermediate frequency;

de-rotating the estimated component by the first frequency to generate a first de-rotated spur estimate; and subtracting the first de-rotated spur estimate from a signal derived from the input signal, wherein the first frequency being a first spur frequency minus half of a digital sampling frequency of the system, the estimating a component of the first rotated signal comprising estimating a digital π-frequency component of the first rotated signal, the first intermediate frequency being half the digital sampling frequency.

14. An apparatus for suppressing at least one frequency spur from an input signal, the apparatus comprising:

a first rotator for rotating the input signal by a first frequency to generate a first rotated signal;

an estimator for estimating a component of the first rotated signal corresponding to a first intermediate frequency to generate a first estimate, wherein the estimated component includes a digital π-frequency component of the first rotated signal;

a first de-rotator for de-rotating the first estimate by the first frequency to generate a first de-rotated spur estimate; and a subtractor for subtracting the first de-rotated spur estimate from a signal derived from the input signal.

15. The apparatus of claim 14, the first frequency being a first spur frequency corresponding to a first spur, the estimator being a DC estimator, the first intermediate frequency being DC.

16. The apparatus of claim 15, the DC estimator comprising a block averaging filter.

17. The apparatus of claim 15, the DC estimator comprising a moving average filter.

18. The apparatus of claim 15, the DC estimator comprising a low-pass filter.

19. The apparatus of claim 15, further comprising:

a second rotator for rotating the input signal by a second spur frequency to generate a second rotated signal;

a second DC estimator for estimating a DC component of the second rotated signal to generate a second DC estimate;

a second de-rotator for de-rotating the second DC estimate by the second spur frequency to generate a second de-rotated spur estimate; and a subtractor for subtracting the second de-rotated spur estimate from the signal derived from the input signal.

20. The apparatus of claim 14, the signal derived from the input signal comprising a signal delayed versus the input signal by a predetermined delay.

21. The apparatus of claim 20, the predetermined delay being a delay associated with the delay of the first estimate.

22. The apparatus of claim 14, the signal derived from the input signal being the input signal.

23. The apparatus of claim 14, the first rotator configured to perform a complex multiplication between a first signal and a second signal.

24. The apparatus of claim 23, the first rotator configured to perform the complex multiplication using the CORDIC algorithm.

25. The apparatus of claim 14, the input signal comprising a received signal from a time slot of a slotted-time communications system.

26. An apparatus for suppressing at least one frequency spur from an input signal, the apparatus comprising:

means for rotating the input signal by a first frequency to generate a first rotated signal;

means for estimating a component of the first rotated signal corresponding to a first intermediate frequency to generate a first estimate, wherein the estimated component includes a digital π-frequency component of the first rotated signal;

means for de-rotating the first estimate by the first frequency to generate a first de-rotated spur estimate; and means for subtracting the first de-rotated spur estimate from a signal derived from the input signal.

27. The apparatus of claim 26, the first frequency being a first spur frequency corresponding to a first spur, the first intermediate frequency being DC.

28. An apparatus for suppressing at least one frequency spur from an input signal, the apparatus comprising:

means for rotating the input signal by at least one spur frequency to generate at least one rotated signal;

means for estimating a DC component for each of the at least one rotated signal to generate at least one DC estimate, wherein the estimated DC component includes a digital π-frequency component of the rotated signal;

means for de-rotating the at least one DC estimate by the at least one spur frequency to generate at least one de-rotated spur estimate; and means for subtracting the at least one de-rotated spur estimate from a signal derived from the input signal.

\* \* \* \* \*